United States Patent

Kiriazis et al.

[11] Patent Number: 6,037,053
[45] Date of Patent: Mar. 14, 2000

[54] FILMS FOR COATING SHAPED-PART BLANKS AND THE USE THEREOF IN AUTOMOBILE MANUFACTURING

[75] Inventors: Leonidas Kiriazis; Egon Wegner, both of Münster, Germany

[73] Assignee: BASF Coatings AG, Muenster-Hiltrup, Germany

[21] Appl. No.: 08/952,100

[22] PCT Filed: May 9, 1996

[86] PCT No.: PCT/EP96/01958

§ 371 Date: Mar. 10, 1998

§ 102(e) Date: Mar. 10, 1998

[87] PCT Pub. No.: WO96/35520

PCT Pub. Date: Nov. 14, 1996

[30] Foreign Application Priority Data

May 10, 1995 [DE] Germany ............................ 195 17 069

[51] Int. Cl.$^7$ ...................................................... B32B 5/16
[52] U.S. Cl. ........................... 428/333; 428/213; 428/215; 428/332; 428/500; 428/520; 428/522; 428/480; 428/423.3

[58] Field of Search ................................. 428/500, 34, 38, 428/262, 520, 522, 543, 918, 480, 423.7, 423.3, 213, 215, 332

[56] References Cited

U.S. PATENT DOCUMENTS

| | | | |
|---|---|---|---|
| 3,968,309 | 7/1976 | Matsuo et al. | 428/409 |
| 4,933,237 | 6/1990 | Krenceski et al. | 428/423.7 |
| 5,030,514 | 7/1991 | Hartman . | |
| 5,100,732 | 3/1992 | Benefiel . | |
| 5,268,215 | 12/1993 | Krenceski et al. | 428/213 |

FOREIGN PATENT DOCUMENTS

| | | | |
|---|---|---|---|
| 0 285 071 A2 | 3/1988 | European Pat. Off. | B44C 5/04 |
| 0 361 823 A2 | 9/1989 | European Pat. Off. | B29C 67/14 |
| 0 395 226 A1 | 3/1990 | European Pat. Off. | B32B 27/40 |
| 0 374 551 B1 | 2/1995 | European Pat. Off. | B05D 7/16 |
| 44 24 290 C2 | 7/1994 | Germany | C08L 23/00 |

*Primary Examiner*—Merrick Dixon

[57] ABSTRACT

The present invention relates to films for coating molding blanks, wherein the surface of a pigmented plastic base film having a thickness of from 10 to 500 μm is coated if desired with an affect coat, if desired with a transparent varnish coat or with a transparent plastic film.

6 Claims, No Drawings

FILMS FOR COATING SHAPED-PART BLANKS AND THE USE THEREOF IN AUTOMOBILE MANUFACTURING

The present invention relates to films for coating molding blanks, to a process for preparing these films, and to the use of the films in automotive construction.

EP-A-374 551 discloses coated substrates which are suitable for producing built-on parts for car bodies. The coated substrates described in EP-A-374 551 consist of metal panels which have been coated with at least one paint coat or of composite materials whose surface layer consists of coated metal panels.

P 4424290.9 discloses substrates coated with two or more coats. These substrates are deformed and are processed further if desired with the aid of additional materials. In this way it is possible to produce build-on parts for vehicle bodies.

The object of the present invention was to provide films for coating molding blanks, which after the deformation of the coated molding blanks have improved properties relative to the coated substrates disclosed in E-A-374 551, and in whose preparation only small amounts solvent are emitted and simple quality monitoring is possible.

This object is achieved in accordance with the invention by the provision of films, wherein
  A. the films consist of a pigmented plastic base film having a thickness of from 10 to 500 $\mu$m,
  B. if desired, an effect coat is applied to the surface of the plastic film, and
  C. the plastic film or the effect coat is coated with a transparent plastic film or with a transparent varnish coat, either of which may be provided with special-effect pigments.

A film which can be peeled off is applied, if desired, to the uncoated side of the base film, the transparent plastic film or the clearcoat.

The present invention also relates to a process for preparing a film coated with two or more coats, where the surface of a pigmented plastic film having a thickness of from 10 to 500 $\mu$m is coated with a transparent plastic film or transparent varnish coat, an additional effect coat is applied, if desired, before the application of the transparent film or varnish coat, and the varnish coat applied to the surface of the pigmented plastic film, or the varnish coats applied, are cured.

A film which can be peeled off is applied, if desired, to the uncoated side of the base film and/or to the transparent plastic film or transparent varnish coat.

A further subject of the present invention is the use of the novel films for coating molding blanks to produce car bodies, and to produce build-on parts for vehicle bodies. Consequently, it is preferred in accordance with the invention to employ coating materials which are suitable for car bodies, provided they have sufficient flexibility for the purposes of the invention.

In a further process variant, the pigmented film can be laminated first of all onto the undeformed substrate, for example a metal panel, which can then be deformed. In this way, if desired, the effect coat is applied. Finally, coating with the transparent varnish or with the transparent film takes place.

The bodywork coated with the novel films is notable for very high resistance to stone chipping and corrosion. Further advantages of the novel coated films are that they can be produced on installations requiring little space, that, owing to the use of plastic films for the coating of bodywork in accordance with the invention, only very small amounts of organic solvent are emitted, and that quality monitoring begins with preparation of the plastic film, whereas in the case of conventional painting of metal panels the quality of the coating cannot be assessed until after the application of the coats of paint to the substrate, and in the case of quality defects the painted substrate as a whole has to be discarded.

In the preparation of the novel films it is primarily thermo plastics which are suitable. The base film can consist of a polyolefin, a polyamide, a polyurethane, a polyester, a polyacrylate, a polycarbonate or a mixture of different polymeric substances, can have a thickness of 10–500, preferably 20–250 $\mu$m, and comprises dyes and/or pigments.

Corresponding materials can be employed for the films which can be peeled off.

To the surface of the pigmented plastic film there is applied if desired —as already mentioned —an effect coat, prior to the application of the transparent film or transparent varnish coat. This can be a further film of a very low level of pigmentation, or a layer of coating material. For the former, suitable materials are the same as those for the base film. Alternatively, the special-effect pigments may be present in the clearcoat or transparent film, so that these pigments take over the function of the effect coat.

The layer of coating material used can be any base coat or top coat suitable for the conventional painting of car bodies, provided it has the pigmentation and flexibility necessary for the purposes of the invention. They essentially comprise a polymeric binder, with or without a crosslinking agent and paint auxiliaries. The base coat or top coat employed can comprise, as binder, for example a polyester resin, a polyurethane resin, an epoxy resin or a polyacrylate resin or a mixture of such binders. As a crosslinking agent the top coat or base coat may comprise an amino resin, a polyisocyanate resin, a carboxyl-containing crosslinking agent or a mixture of such crosslinking agents.

Examples of suitable paint auxiliaries are antifoams, antisettling agents, leveling assistants and rheological assistants, for example Viscalex HV30 from Allied Colloids Ltd or a phyllosilicate (Laponite from Laporte).

Examples of special-effect pigments are pearl luster pigment from Merck, metal flakes, etc.

The pigment to binder solids ratio in this case is $\leq 0.01:1$, preferably $\leq 0.006:1$ and, with particular preference, $\leq 0.003:1$.

A transparent varnish coat is applied if desired so the surface of the pigmented or colored plastic film and/or to the above-described effect coat. It is possible here to employ all transparent coating materials which can be employed for conventional automotive finishing. It is also possible to employ transparent powder coatings. These transparent coating materials also consist of a binder, a crosslinking agent and further customary additives.

The layers of coating material are normally cured by heating at temperatures from 60 to 230° C. On such heating there is a reaction between the binders and crosslinking agents present in the paints, and three-dimensional polymer networks are formed which give the paint surface a particularly high resistance to mechanical or chemical attack.

The paint coats can be applied, for example, by spraying, roller coating or knife coating.

The novel films described can be rolled together. As a result, the products can be sold and supplied in the from of rolls. The coating materials which may be employed must therefore have a flexibility sufficient for this purpose.

The films can be applied in principle to all moldings, suitable for producing vehicle bodies, build-on parts for vehicle bodies, domestic appliances, for example refrigerators, washing machines and dishwashers. The films are applied predominantly to pretreated metal panels. These can have been pretreated, for example, by phosphating and/or chromating.

As an alternative to the clearcoat, a transparent plastic film can be applied to the pigmented film or the effect coat. In principle, it is possible here to employ all materials also suitable for the base film.

The uncoated or coated plastic films described can be laminated onto the surface of a molding blank, preferably one comprising sheet metal.

The metal sheet can be coated in succession with a base film, an effect coat if desired, and a transparent plastic film or a transparent clear coat. From the metal sheet coated in this way, which can be stored and supplied in roll form, automotive parts are cut out and shaped.

Alternatively the pigmented base film is first of all coated in succession with an effect coat, if desired, and, with a transparent varnish or transparent plastic film. This coat system is laminated onto a metal sheet from which automotive parts are produced by cutting out and deforming. The requirements regarding the flexibility of the coating materials employed must, consequently, also be oriented toward the above-described application techniques.

A further preparation option is

A. laminating the pigmented base film onto the substrate,

B. carrying out the deformation of the substrate,

C. carrying out the deformation of the substrate, applying an effect coat, if desired, and D. applying a transparent varnish coat or transparent plastic film.

Adhesion to the surface which is to be coated can be brought about in various ways. One possibility, for example, is to employ films having adhesion-promoting groups, for example urethane groups, acid anhydride groups or carboxyl groups, or films which have been provided with adhesion-promoting groups by coextrusion with a polymer which contains adhesion-promoting groups. Adhesion between the film and the surface to be coated can also be achieved by using an adhesive. In this case it is possible to employ both adhesives which are solid at room temperature and adhesives which are liquid at room temperature.

When applying films having adhesion-promoting groups by lamination, the substrate is generally covered with the film such that the adhesion promoter layer contacts the substrate surface. By applying pressure and heat film is then laminated onto the surface which is to bo coated. The pressure and temperature here should be chosen so as to give a firm bond between the substrate and the film. When using adhesives which are solid at room temperature, the procedure is similar. If liquid adhesives are employed, the procedure is generally that the liquid adhesive is applied to the substrate and the coated plastic film is laminated onto the heated substrate that has been coated with the adhesive.

The invention is illustrated in more detail in the working examples below. All percentages and parts are to be understood as being by weight unless expressly stated otherwise.

EXAMPLE 1

The adhesion promoter layer of a white pigmented, thermoplastic polyurethane film 60 $\mu$m thick (Elastollan® EL 1184A from Elastogran GmbH) which has been provided with a 20-$\mu$m thick adhesion promoter layer comprising a polyester based on 1,4-butanediol and terephthalic/isophthalic acid (1:1) is covered with a release paper. The side of the film which has not been covered is then coated with a customary commercial 2-component clearcoat based on polyacrylate/polyisocyanate (dry film thickness: 40–50 $\mu$m) and then baked at 130° C. for 30 minutes. After removing the release paper, the resulting laminate is laminated at a temperature of 220° C. and a pressure of 50 bar onto a bodywork panel (Bonder 2660 OC).

Clearcoat

Pigmented film

Adhesion promoter

EXAMPLE 2

The adhesion promoter layer of a white pigmented, thermo-plastic polyurethane film 60$\mu$m thick (Elastollan® EL 1184A from Elastogran GmbH) which has been provided with a 20-$\mu$m thick adhesion promoter layer comprising a polyester based on 1,4-butanediol and terephthalic/isophthalic acid (1:1) is covered with a release paper. A transparent polyester film (Melinexs®, ICI) which has been provided with a 20$\mu$m thick adhesion promoter layer comprising a polyester based on 1,4-butanediol and terephthalic/isophthalic acid (1:1) is pressed onto that side of the film which has not been covered, at a temperature of 150° C. and a pressure of 25 bar. After removing the release paper, the resulting laminate is laminated at a temperature of 220° C. and a pressure of 50 bar onto a bodywork panel (Bonder 2660 OC).

PET film

Adhesion promoter layer

White pigmented film (PUR)

Adhesion promoter

EXAMPLE 3

The procedure of Example 1 is repeated but with the difference that the 2-component clearcoat contains 0.25%, based on the amount of paint solids, of an Iriodin special-effect pigment (pearl white, from Merck).

Effect coat

White pigmented film

Adhesion promoter

Testing the Coated Substrates

The coated substrates produced in accordance with Examples 1 to 3 showed excellent resistance values both in the VDA [German Automobile Manufacturers Association] stone chip test (2×500 g at 2 bar) and in the Mercedes Benz ball shot test (VDA: rating 1; ball shot test: degree of rusting=0, degree of flaking: $\leq$2 mm$^2$). To test the corrosion resistance, the coated substrates were scribed with a slit about 10 cm long extending down to the metal panel, and were subjected to a salt spray test in accordance with DIN 50 021. After 6 weeks no scribe creep was evident.

We claim:

1. A film for coating molding blanks, comprising

A a pigmented plastic base film having a first and a second surface and a thickness of from 10 to 500 $\mu$m, the plastic base film consisting of a polymer selected from the group consisting of a polyolefin, a polyamide, a polyurethane, a polyacrylate, a polycarbonate or mixtures thereof, B optionally, an effect coat applied to the first surface of the plastic film, and C a transparent plastic film or transparent varnish coat coated on the plastic base film or the effect coat.

2. The film of claim 1, further comprising a peelable plastic film applied over the transparent varnish coat or transparent plastic film.

3. The film of claim 1, wherein the transparent plastic film or transparent varnish coat are resistant to UV light.

4. The film of claim 1, further comprising an adhesion promoter layer arranged between the plastic base film and the transparent plastic film or transparent varnish coat.

5. The film of claim 1 wherein the transparent plastic film or transparent varnish coat comprises special effect pigments.

6. The film of claim 1 which is flexible and can be rolled up.

\* \* \* \* \*